Figure 1:
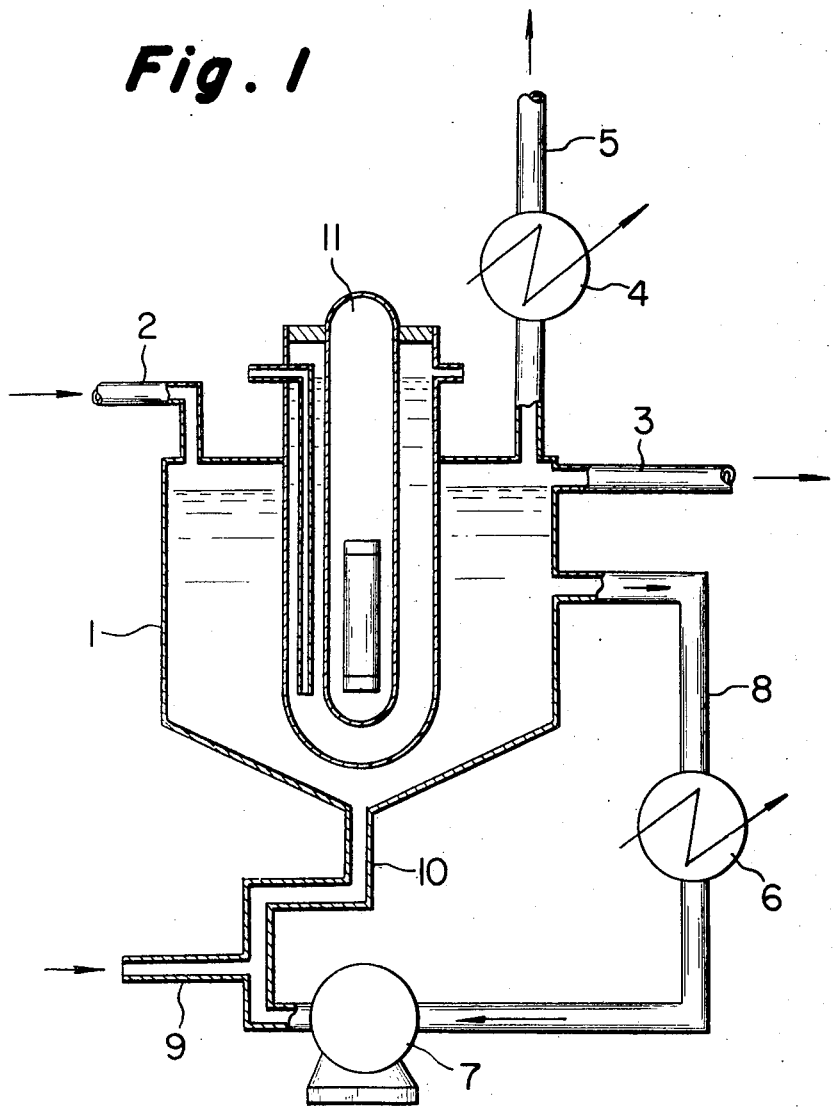

United States Patent [19]
Takamizawa et al.

[11] 3,844,915
[45] *Oct. 29, 1974

[54] PROCESS FOR PREPARING ORGANOCHLOROSILANES

[75] Inventors: Minoru Takamizawa; Takayoshi Hayashi; Masatoshi Takita, all of Annaka, Japan

[73] Assignee: Shinetsu Chemical Company, Chiyoda-ku, Tokyo, Japan

[ * ] Notice: The portion of the term of this patent subsequent to Mar. 15, 1989, has been disclaimed.

[22] Filed: Aug. 1, 1972

[21] Appl. No.: 276,909

[30] Foreign Application Priority Data
Aug. 2, 1971   Japan.............................. 46-58147

[52] U.S. Cl........... 204/158 R, 204/162 R, 250/527
[51] Int. Cl............................................... B01j 1/10
[58] Field of Search..... 204/158 R, 158 HA, 162 R, 204/163; 250/527

[56] References Cited
UNITED STATES PATENTS
3,437,573   4/1969   Hurley et al. ................... 204/163 R
3,642,596   2/1972   Takamizawa et al. .......... 204/158 R Primary Examiner—Howard S. Williams
Attorney, Agent, or Firm—Toren, McGeady and Stanger

[57] ABSTRACT

Aromatic group containing organochlorosilanes are prepared by mixing chlorine, in the absence of irradiation, with a mixture of trichlorosilanes or methyldichlorosilanes and aromatic compounds, the then introducing the resulting mixture within an extremely short period of time into a zone irradiation with light, at least 30 percent of whose rays have wave lengths not exceeding 3,800 Angstrom. A wide variety of aromatic group containing organochlorosilanes are selectively obtained by the inventive process with high yields. Further, the formation of byproducts, which are difficult to separate and/or which have not utility, is effectively prevented.

8 Claims, 2 Drawing Figures

PROCESS FOR PREPARING ORGANOCHLOROSILANES

FIELD OF THE INVENTION

This invention relates to an improved process for prepaaring organochlorosilanes containing aromatic radicals or groups from a chlorosilane containing a Si—H bond and an aromatic compound. Organochlorosilanes containing aromatic radicals, such as diphenyldichlorosilane or phenyltrichlorosilanes, are important starting materials for silicone oils, silicone varnishes and silicone rubbers.

PRIOR ART

The following four procedures have previously been used for preparing aromatic group containing organochlorosilanes:

a. Grignard's method which is practiced by reacting aryltrichlorosilane with halogenated methyl magnesium, or methyltrichlorosilane with halogenated aryl magnesium, for the purpose of obtaining aryl methyldichlorosilane; alternatively, silicon tetrachloride is reacted with halogenated aryl magnesium for the purpose of obtaining aryl trichlorosilane.

b. A method which is practiced by dehydrogenating methyldichlorosilane or trichlorosilane, together with aromatic hydrocarbons, employing boron chloride as a catalyst; or dehydrochlorinating such chlorosilanes by employing chlorinated aromatic hydrocarbons.

c. The direct method which is practiced by reacting metallic silicon with chlorobenzene so as to obtain phenylchlorosilanes.

d. The disproportionation method which is practiced by reacting phenyltrichlorosilane obtained by the direct method with trimethyl chlorosilane.

All four prior art procedures have, however, serious drawbacks. Grignard's method (a) above has the disadvantage that it requires a large quantity of ether. Further, it is difficult to remove byproducts, a fact which greatly complicates the process. In respect to method (b), the dehydrogenation and dehydrochlorination have to be conducted at high temperature and/or under high pressures which requires elaborate equipment. Regarding method (c), when the direct method is adopted, phenyltrichlorosilane, which is the desired product, is obtained merely as a byproduct of diphenyldichlorosilane in small quantity. Particularly when the phenyl group has various substitution radicals, the synthesis by this direct method often becomes extremely difficult to carry out. Concerning method (d), the disproportionation reaction method has the disadvantage of having to be practiced under the severe conditions of high temperatures and high pressures, and the reaction product contains unreacted phenyltrichlorosilane which can be separated only with great difficulty.

It has also been suggested as a method for preparing silanes of this kind (cf., specification of U.S.S.R. Pat. No. 162,842) that a mixture of aromatic hydrocarbons and hydrogen chlorosilane, e.g., a mixture of benzene and methyldichlorosilane or of benzene and trichlorosilane, be irradiated with light coming from the source of an incandescent electric lamp, thereby obtaining phenyl methyl dichlorosilane or phenyltrichlorosilane. By this method it is possible to obtain the desired product, unaccompanied by any byproduct which is difficult to separate. However, the yield rate of the desired product, to wit, organochlorosilane containing aromatic radicals or groups, to hydrogen chlorosilane is low. For example, in the synthesis of phenyl methyl dichlorosilane, the yield rate is 12 percent by weight, and in that of phenyltrichlorosilane, about 39 percent by weight. Even more disadvantageous is that, in the former case, most of the methyl dichlorosilane turns into unwanted methyltrichlorosilane. In the latter case, the unreacted material is converted into unwanted silicon tetrachloride. Further, it is difficult to prepare organochlorosilanes having variable aromatic radicals by this method. The only compounds which can be readily prepared are phenylchlorosilane and phenyl methyl dichlorosilane.

In order to solve these problems, we conducted studies on the photochlorination processes and disclosed a process wherein a mixture of methyldichlorosilane and benzene is irradiated in the presence of chlorine with light, at least 30 percent of which has a wavelength not exceeding 3,800 Angstrom, to obtain phenylmethyldichlorosilane, in U.S. Pat. No. 3,642,596, British Pat. Specification No. 1,251,406 and German Pat. No. 1,945,252. However, we have discovered that this process has a drawback with respect to the introduction of chlorine gas to the bottom of the liquid layer in a reactor in the presence of irradiation by the light. According to the process, methyldichlorosilanes are converted to silicon tetrachloride and carbon as by-products in the bubbles of chlorine wherein radicals are formed by the irradiation. The carbon thus produced works to hinder the transmission of the light. Besides, a side reaction wherein benzene is converted to hexachlorocyclohexanes takes place and the hexachlorocyclohexanes thus formed tend to adhere to the surfaces of the porous part of a chlorine-introducing tube, so that the feeding of the chlorine may become difficult.

SUMMARY OF THE INVENTION

An object of the present invention is to provide a process, free from the above drawbacks, for preparing organochlorosilanes containing aromatic radicals or groups.

Another object of the invention is to provide a process for preparing organochlorosilanes containing variable aromatic radicals, from chlorosilanes having a S13 H bond and aromatic compounds.

A still further object of the invention is to provide a process for preparing such organochlorosilanes at high yield rates, unaccompanied, as much as possible, by by-products which are hard to separate or of little utility value.

These and other objects may be achieved by the present invention which provides improvements in a process for preparing aromatic group containing organochlorosilanes by irradiating with light, in the presence of chlorine, a mixture of a chlorosilane having the general formula

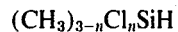

wherein $n$ is an integer of 2 and 3 and an aromatic compound having the general formula

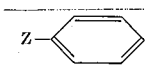

wherein Z is a hydrogen atom, a halogen atom, or a monovalent organic radical selected from the group consisting of alkyl, haloalkyl, alkoxy, phenyl, halophenyl, phenoxy, phenylmethylene, and dialkylamino radicals. The improvement comprises adding the chlorine gas to the mixture of a chlorosilane and aromatic compound in the absence of irradiation and then introducing the resulting mixture within an extremely short period of time into a zone irradiated with light, at least 30 percent of whose rays have a wavelength not exceeding 3,800 Angstrom.

The preparation by this process of organochlorosilanes is carried out by photochemically reacting a mixture of a chlorosilane of the above-mentioned general formula and an aromatic compound of the above-mentioned general formula in the presence of chlorine, provided that the chlorine has preliminarily been introduced into the mixture outside of the irradiation zone and the mixture thus containing the chlorine gas has been moved into the irradiation zone, so that aromatic group containing organochlorosilanes can be obtained at high yields, under ordinary pressure and at ordinary temperatures, with no need to provide a special vessel for dissolving the chlorine. In addition, according to the process, the formation of valueless by-products, such as, silicon tetrachloride and methylchlorosilane, may be restrained to the lowest possible level.

According to the process of the invention, chlorosilanes of the above-mentioned general formula and aromatic compounds of the above-mentioned general formula are charged into a reactor provided with a light source to form a liquid mixture. On the other hand, chlorine gas or a gaseous mixture of chlorine and a diluent gas, such as, nitrogen, is introduced into a part of the liquid mixture to contact with each other in a zone which is apart from the irradiation zone and free from irradiation. Then, the part of the liquid mixture containing chlorine is moved by flow within an extremely short period of time of 1 second or less, preferably 0.01 to 1 second, and more preferably 0.1 to 0.5 second, into the irradiation zone to react. The duration of contact of the chlorine with the liquid mixture in the zone, free from irradiation must be extremely short. If the duration is longer than the period of time specified above, the formation of unwanted methyltrichlorosilanes may, disadvantageously, be promoted.

It has been observed that, although the chlorine atoms absorb light covering a wide range of wavelengths with 3,300 Angstrom as the peak, if a large quantity of light having a wavelength of above 5,000 Angstrom is used, the formation of byproducts such as silicon tetrachloride is promoted, and that in order to prepare only the desired organochlorosilanes containing aromatic groups in the best yields, at least 30 percent, or preferably at least 40 percent, of the light must have wavelengths not exceeding 3,800 Angstrom.

A satisfactory light source to be employed in the process of the invention in order to meet the conditions specified above may be a high-pressure mercury lamp, a low-pressure mercury lamp, a xenon arc lamp or hydrogen arc lamp.

The process of this invention has an advantage, from the viewpoint of the continuous operation and the industrial production, in that the process can be performed with good yields under ordinary pressures and at ordinary temperatures. Any increase in temperatures due to the exothermic reactions in the course of operation brings no difficulty.

The chlorosilane, used as one of the principal starting materials in practicing the process of the invention, is represented by the general formula

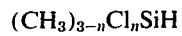

wherein $n$ is an integer of 2 orf 3, and may be exemplified by trichlorosilane and methyldichlorosilane. The former is preferred having regard to its good reactivity.

The other reactant, i.e., the aromatic compound, is represented by the general formula

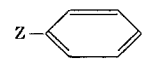

wherein Z is hydrogen, halogen or a monovalent organic radical such as alkyl, haloalkyl, alkoxy, phenyl halophenyl, phenoxy, phenylmethylene or dialkylamino radical. The compounds may be exemplified by benzene and derivatives of benzene in which the benzene nucleus is substituted with one or more halogen, i.e., chlorine, fluorine, iodine or bromine, saturated aliphatic hydrocarbon radicals containing not more than 12 carbon atoms, such as methyl, ethyl, propyl, butyl and dodecyl radicals, haloalkyl radicals such as chloromethyl, β-chloroethyl, γ-chloropropyl, γ-dichloropropyl, γ-difluoropropyl and γ-trifluoropropyl, β-fluoroethyl, γ-fluoroproyl, γ-difluoropropyl and γ-trifluoropropyl radicals, alkoxy radicals such as methoxy, ethoxy, propoxy and buthoxy radicals, halophenyl radicals such as chlorophenyl radical, or dialkylamino radicals such as dimethyl amino, diethyl amino, dipropyl amino and dibutyl amino radicals.

The chlorosilane having Si—H bond and the aromatic compound used as starting materials may be mixed in a mole ratio of from 5:95 to 90:10, or more preferably, from 10:90 to 70:30. Chlorine is blown into the mixture mixture of chlorosilane and aromatic compound in the absence of irradiation in such an amount as will be absorbed by the mixture. In this case, if the chlorine gas is diluted beforehand with an inert gas, such aas nitrogen, its absorption by the mixed liquids will be carried out more uniformly, giving favorable results. Generally, the amount of chlorine supplied throughout the reaction is 0.1 to 3 moles, or preferably 0.2 to 2 moles, per mole of Si—H group. As to the reaction time, it may be from 0.5 to 25 hours. The quantity of light employed in the irradiation may be large enough to generate free radicals (Cl—) in such a quantity as to have the reaction of the invention proceed, viz., 1 to 1,000 watt, or preferably 5 to 500 watt per kg of the reaction liquid.

Figure 2:
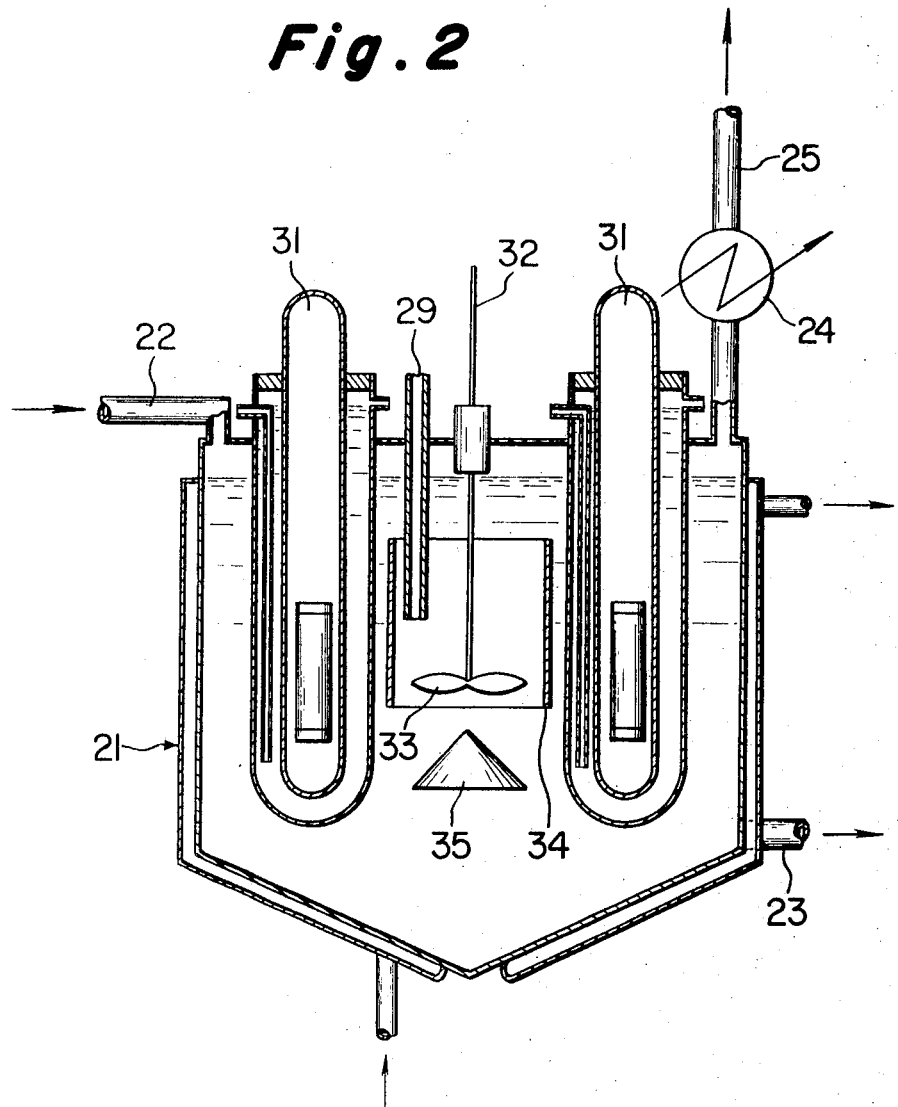

The invention will be better understood from the following descriptions taken in connection with the accompanying drawings in which:

FIG. 1 illustrates the practice of one preferred embodiment of this process: and, FIG. 2 illustrates the practice of another preferred embodiment of this process.

The apparatuses illustrated in the drawings are given for purposes to explain the invention and it is to be understood that the invention is not limited to the specific apparatuses.

Referring to FIG. 1, a reactor 1 is shown which is provided with a lining or a coating resistant to chlorine and hydrogen chloride, or which is constructed of nickel, titanium, or an alloy thereof as is usual with such cases. The reactor has in its upper part an inlet for charging reactant liquid 2, an outlet for removing product 3, a reflux condenser 4, and an exit for hydrogen chloride 5. The side part and the bottom part of the reactor are connected with tubes 8 and 10, respectively. A cooler 6 and a pump 7 are connected with said tube 8. A tube for introducing chlorine 9 and said pump 7 are connected with said tube 10. The tube 10 is constructed so as to shield the content from the light. In the central part of the reactor is placed a light source 11. Chlorine introduced by said tube 9 is mixed with the reactant liquid circulated by the pump 7. The performance of the pump, and the diameters and the lengths both of the tube 9 and tube 10 must be selected so that the reactant liquid is transferred to the zone irradiated with the light from said light source within an extremely short period of time, preferably less than one second. The process of this invention is not limited to the manner in the figures. The reactant liquid can be fed before or behind the pump. The reaction product can be removed from the bottom of the reactor, or before or behind the pump except the part whereat chlorine is introduced.

To operate with this apparatus, the reactant liquid introduced from the inlet 2 is circulated by means of the pump 7 and mixed with chlorine from the tube 9. In an extremely short period of time after mixing with chlorine, preferably less than 1 second, the chlorine containing reactant liquid is irradiated with light emitted from the light source 11. The reaction product is removed from the tube 3 and hydrogen chloride evolved exits from the tube 5 by way of the condenser 4.

The apparatus shown in FIG. 2 is for another embodiment of the process of this invention. The reactor 21 having a provision for cooling is constructed of a corrosion-resistant material. The reactor 21 has an inlet for charging reactant liquid 22, a reflux condenser 24, and an exit for hydrogen chloride 25 in its upper part. The reactor has an outlet for removing the product 23 in its lower part. In the central part of the reactor are positioned a stirrer and a tube for introducing chlorine 29. Said stirrer has a rotating shaft 32 along the axis of the reactor and blades 33, such as paddle-type, propeller-type, or turbine-type. Said tube 29 is constructed so as to shield its content from the light and any other light from outside. Two light sources 31 similar to the light source mentioned above are positioned on both sides. Said rotating blades 33 are provided for mixing completely the reactant liquid with chlorine introduced from the tube 29. A cone 35 is placed beneath the blades to uniformly guide the obtained chlorinecontaining reactant liquid to the zone irradiated by the light sources 31. The stirrer and the tube 29 is surrounded with a draft tube 34 which is also constructed so as to shield its content from the light. The diameter of the tube for introducing chlorine 29, the flow rate, the speed of agitation, and the shapes of blades should be selected so that the reactant liquid is irradiated with the light from said light sources within an extremely short period of time after mixing with chlorine, preferably less than 1 second. To operate with this apparatus, the reactant liquid fed from the inlet 22 is mixed sufficiently with chlorine from the tube 29 by the blades 33, and thereafter is uniformly distributed into the zone irradiated with the light from the light sources 31 to react there. The reaction product is removed by way of the tube 23 and the evolved hydrogen chloride is expelled through the condenser 24.

This invention is illustrated by the following Examples and Controls, in which parts are all by weight unless otherwise indicated.

EXAMPLES 1 – 7 and CONTROLS 1 – 6.

In the apparatus shown by FIG. 1 used in these Examples was installed a 100 W high-pressure mercury lamp equipped with a cooling jacket containing cold water. 54 percent of rays emitted from the lamp had wavelengths not exceeding 3,800 Angstrom. Into the reactor of the apparatus 863 parts of methyldichlorosilane and 1,365 parts of benzene were charged and circulated by means of the pump 7. After the atmosphere inside the reactor had been replaced by nitrogen, the mercury lamp was lighted. At the same time, a gas stream of chlorine was introduced through the inlet 9. Reactions were then carried out under varied conditions as designated in the following Table Table 1, as Examples 1 – 7. The results of those reactions are also shown in the table.

Further, by way of comparison, controls were performed. The apparatus used by the control tests was a reactor equipped with a reflux condenser, a thermometer and a gas inlet in its center and also with a 100 W high-pressure mercury lamp similar to that employed in Examples 1 – 7. 863 parts of methyldichlorosilane and 1,365 parts of benzene were charged into the reactor and agitated. After the atmosphere in the reactor was replaced by nitrogen, the mercury lamp was lighted. At the same time, chlorine gas was introduced to the bottom of the liquid mixture. Then, reactions were carried out under varied conditions as designated in Table 1, as Controls 1 – 6. The results obtained are shown also in the table.

Table 1

| | Examples | | | | | | | Controls | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Methyldichlorosilane charged, parts | 863 | 863 | 863 | 863 | 863 | 863 | 863 | 863 | 863 | 863 | 863 | 863 | 863 |
| Benzene charged, parts | 1365 | 1365 | 1365 | 1365 | 1365 | 1365 | 1365 | 1365 | 1365 | 1365 | 1365 | 1365 | 1365 |
| Circulation rate, lit./hr. | 420 | 240 | 60 | 8 | 420 | 420 | 420 | — | — | — | — | — | — |
| Time elapsed after mixing of $Cl_2$ till irradiation, sec. | 0.11 | 0.23 | 0.90 | 6.80 | 0.11 | 0.11 | 0.11 | — | — | — | — | — | — |
| Feed rate of $Cl_2$, parts/hr. | 71 | 71 | 71 | 71 | 25 | 100 | 142 | 25 | 50 | 71 | 100 | 142 | 71 |

Table 1 — Continued

|  | Examples | | | | | | | Controls | | | | | |
| --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 |
| Reaction time, hr. | 6.8 | 6.8 | 6.8 | 6.8 | 19.2 | 4.8 | 3.4 | 19.2 | 9.6 | 6.8 | 4.8 | — | — |
| Liquid recovered, parts | 2245 | 2260 | 2240 | 2255 | 2235 | 2242 | 2248 | 2233 | 2245 | 2263 | 2275 | — | — |
| Analysis of liquid recovered: | | | | | | | | | | | | | |
| Methyldichlorosilane, % | 4.0 | 4.0 | 4.0 | 4.5 | 4.0 | 3.8 | 4.0 | 4.5 | 4.0 | 4.0 | 4.2 | — | — |
| Methyltrichlorosilane, % | 6.7 | 9.5 | 11.8 | 19.7 | 4.2 | 6.9 | 7.3 | 15.5 | 20.3 | 23.8 | 27.2 | — | — |
| Benzene, % | 44.4 | 44.2 | 45.7 | 46.5 | 45.0 | 43.8 | 43.6 | 41.8 | 43.2 | 44.8 | 46.5 | — | — |
| Phenylmethyldichlorosilane, % | 33.5 | 31.3 | 26.5 | 22.5 | 37.3 | 32.5 | 31.7 | 30.5 | 27.0 | 22.0 | 12.8 | — | — |
| Substance having high boiling point, % | 11.4 | 11.0 | 12.0 | 6.8 | 9.5 | 13.0 | 13.7 | 7.7 | 5.5 | 5.4 | 7.3 | — | — |
| Yield of phenylmethyldichlorosilane on the basis of methylchlorosilane fed, % | 58.6 | 55.2 | 46.2 | 40.1 | 65.0 | 56.4 | 55.5 | 53.8 | 47.2 | 38.8 | 22.9 | * | ** |

\* The reaction liquid turned black and the reaction was interrupted.
\*\* The foam glass for bubbling chloride gas clogged and the reaction was interrupted.

EXAMPLES 8 – 9.

Using the apparatus shown by FIG. 2, provided with a propeller-type agitator having the performance of 50 lit/min. and two high-pressure mercury lamps similar to that of Examples 1 – 7, reactions were carried out under various conditions designated in the following Table 2. The results obtained are shown in the Table.

Table 2

|  | Examples | |
| --- | --- | --- |
|  | 8 | 9 |
| Methyldichlorosilane charged, parts | 863 | 863 |
| Benzene charged, parts | 1,365 | 1,365 |
| Circulation rate, lit./hr. | 3,000 | 3,000 |
| Time elapsed after mixing of Cl₂ till irradiation, sec. | 0.17 | 0.17 |
| Feed rate of Cl₂, parts/hr. | 71 | 142 |
| Reaction time, hr. | 6.8 | 3.4 |
| Liquid recovered, parts | 2,239 | 2,248 |
| Analysis of liquid recovered: | | |
| Methyldichlorosilane, % | 4.0 | 4.5 |
| Methyltrichlorosilane, % | 6.5 | 7.4 |
| Benzene, % | 44.6 | 42.9 |
| Phenylmethyldichlorosilane, % | 33.7 | 32.0 |
| Substance having high boiling point, % | 11.2 | 13.2 |
| Yield of phenylmethyldichlorosilane on the basis of methyldichlorosilane fed, % | 58.8 | 56.9 |

EXAMPLES 10 – 13 and CONTROLS 7 – 9.

With the apparatus and the light source of Example 1, the procedure of Example 1 was repeated except that the methyldichlorosilane was replaced by trichlorosilane. Reactions were conducted under various conditions designated in the following Table 3. The results obtained are shown in the table.

Further, by way of comparison, controls were performed. With the apparatus and the light source of Control 1, the procedure of Control 1 was repeated except that the methyldichlorosilane was replaced by trichlorosilane. Reactions proceeded under various conditions designated in Table 3. The results obtained are shown in the Table.

Table 3

|  | Examples | | | | Controls | | |
| --- | --- | --- | --- | --- | --- | --- | --- |
|  | 10 | 11 | 12 | 13 | 7 | 8 | 9 |
| Trichlorosilane charged, parts | 813 | 813 | 813 | 813 | 813 | 813 | 813 |
| Benzene charged, parts | 1,092 | 1,092 | 1,092 | 1,092 | 1,092 | 1,092 | 1,092 |
| Circulation rate, lit/hr. | 420 | 8 | 2 | 420 | — | — | — |
| Time elapsed after mixing of Cl₂ till irradiation, sec. | 0.11 | 6.8 | 27.3 | 0.11 | — | — | — |
| Feed rate of Cl₂, parts/hr. | 71 | 71 | 71 | 142 | 25 | 71 | 142 |
| Reaction time, hr. | 5.4 | 5.4 | 5.4 | 2.7 | 15.5 | 5.4 | 2.7 |
| Liquid recovered, parts | 1,915 | 1,920 | 1,930 | 1,918 | 1,920 | 1,923 | 1,930 |
| Analysis of liquid recovered: | | | | | | | |
| Trichlorosilane, % | 4.3 | 4.5 | 4.2 | 4.5 | 4.0 | 4.5 | 4.0 |
| Silicon tetrachloride, % | 0.7 | 1.0 | 5.3 | 0.8 | 3.5 | 5.7 | 11.0 |

Table 3—Continued

| | Examples | | | | Controls | | |
|---|---|---|---|---|---|---|---|
| | 10 | 11 | 12 | 13 | 7 | 8 | 9 |
| Benzene, % | 37.8 | 38.7 | 37.0 | 38.0 | 35.7 | 37.8 | 42.5 |
| Phenyltrichlorosilane, % | 52.3 | 47.8 | 37.7 | 50.6 | 42.0 | 38.0 | 29.5 |
| Substance having high boiling point, % | 4.9 | 8.0 | 15.8 | 6.1 | 14.8 | 15.0 | 13.0 |
| Yield of phenyltrichlorosilane on the basis of trichlorosilane fed, % | 86.8 | 80.9 | 63.8 | 85.5 | 70.1 | 64.4 | 49.6 |

EXAMPLES 14 – 18.

The procedure of Example 1 was repeated except that benzene was replaced by another aromatic compound, i.e., chlorobenzene, toluene, or diphenyl ether. Reactions between the chlorosilanes and aromatic compounds were carried out under the conditions given in the following Table. The results obtained are shown in the Table.

Table 4

| | Examples | | | | |
|---|---|---|---|---|---|
| | 14 | 15 | 16 | 17 | 18 |
| Aromatic compounds (A) | Chlorobenzene | Toluene | Diphenyl ether | Chlorobenzene | Toluene |
| Objective Compound (B) | Chlorophneyl trichlorosilane | Tolyltrichlorosilane | Phenoxyphenyl trichlorosilane | Chlorophnyl methyldichlorosilane | Tolylmethyl dichlorosilane |
| Trichlorosilane charged, parts | 813 | 813 | 813 | — | — |
| Methyldichlorosilane charged, parts | — | — | — | 690 | 690 |
| Compound charged (A), parts | 1,575 | 1,288 | 2,380 | 1,575 | 1,288 |
| Circulation rate, lit./hr. | 420 | 420 | 420 | 420 | 420 |
| Time elasped after mixing of Cl$_2$ till irradiation, sec. | 0.11 | 0.11 | 0.11 | 0.11 | 0.11 |
| Feed rate of Cl$_2$, parts/hr. | 71 | 71 | 71 | 71 | 71 |
| Reaction time, hr. | 5.4 | 5.4 | 5.4 | 5.4 | 5.4 |
| Liquid recovered, parts | 2,398 | 2,107 | 3,201 | 2,283 | 1,990 |
| Analysis of liquid recovered: | | | | | |
| Trichlorosilane, % | 9.2 | 7.8 | 8.3 | — | — |
| Methyldichlorosilane, % | — | — | — | 4.3 | 4.2 |
| Silicon tetrachloride, % | 5.3 | 5.2 | 5.7 | — | — |
| Methyltrichlorosilane, % | — | — | — | 10.2 | 12.0 |
| Unreacted compound (A), % | 47.0 | 47.4 | 54.5 | 48.3 | 47.1 |
| Product compound (B), % | 31.3 | 33.5 | 20.6 | 25.1 | 26.1 |
| Substance having high boiling point, % | 7.2 | 6.1 | 10.9 | 12.1 | 10.6 |
| Yield of compound (B) on the basis of starting chlorosilane fed, % | 69.7 | 65.4 | 53.8 | 49.4 | 48.0 |

What is claimed is:

1. In the process for preparing aromatic group containing organochlorosilanes comprising irradiating, in the presence of chlorine, a liquid mixture of a chlorosilane having the general formula

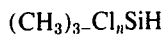

$(CH_3)_{3-n}Cl_nSiH$ wherein $n$ is an integer of 2 or 3 and an aromatic compound having the general formula

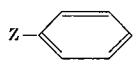

wherein Z is hydrogen, halogen, or a monovalent organic radical selected from the group consisting of alkyl, haloalkyl, alkoxy, phenyl, halophenyl, phenoxy, phenylmethylene, and dialkylamino radicals, the irradiation being carried out with light, at least 30 percent of whose rays have wavelengths not exceeding 3,800 Angstrom, the improvement which comprises the step of bringing said chlorine into admixture with said liquid mixture in the absence of said irradiation and then introducing, within from 0.01 to 1 second, the resulting admixture to a zone where said irradiation takes place.

2. The process of claim 1 wherein said chlorosilane and said aromatic compound are mixed in a mole ratio of from 5:95 to 90:10.

3. The process of claim 1 wherein said chlorine introduced into said mixture is diluted with inert gas.

4. The process of claim 1 wherein the quantity of chlorine supplied is from 0.1 to 3 mole per mole of Si—H bond in said chlorosilane.

5. The process of claim 1 wherein the amount of light emitted from the light source is from 1 to 1,000 watts per kg. of the reactants in the mixture.

6. The process of claim 1 wherein said chlorosilane is methyldichlorosilane.

7. The process of claim 1 wherein said chlorosilane is trichlorosilane.

8. The process of claim 1 wherein time period after the admixing step and prior to irradiation is in the range from 0.1 to 0.5 second.

* * * * *

UNITED STATES PATENT OFFICE
CERTIFICATE OF CORRECTION

Patent No. 3,844,915            Dated October 29, 1974

Inventor(s) Minoru Takamizawa, T. Hayashi, M. Takita, H. Araki

It is certified that error appears in the above-identified patent and that said Letters Patent are hereby corrected as shown below:

In the heading of the patent, the names of the inventors should read:

--[75] Minoru Takamizawa; Takayoshi Hayashi; Masatoshi Takita; Hitoyuki Araki, all of Annaka-shi, Gunma-ken, Japan--

Signed and sealed this 10th day of June 1975.

(SEAL)
Attest:

RUTH C. MASON
Attesting Officer

C. MARSHALL DANN
Commissioner of Patents
and Trademarks